(12) United States Patent
Lyons

(10) Patent No.: US 6,450,302 B1
(45) Date of Patent: Sep. 17, 2002

(54) AUTOMATIC SLACK ADJUSTER WITH TWO PART LIFT ROD

(75) Inventor: John T. Lyons, South Wales, NY (US)

(73) Assignee: Crewson Brunner Inc., Buffalo, NY (US)

( * ) Notice: Subject to any disclaimer, the term of this patent is extended or adjusted under 35 U.S.C. 154(b) by 0 days.

(21) Appl. No.: 09/862,951

(22) Filed: May 22, 2001

(51) Int. Cl.[7] .............................................. F16D 65/38
(52) U.S. Cl. .............................. 188/196 V; 188/79.55; 188/196 BA
(58) Field of Search ....................... 188/196 V, 79.55, 188/71.9, 196 BA, 196 B, 196 D, 196 R; 192/111 A, 46, 108

(56) References Cited

U.S. PATENT DOCUMENTS

| | | | | |
|---|---|---|---|---|
| 3,997,036 A | * | 12/1976 | Zeidler | ................. 188/196 BA |
| 4,114,733 A | * | 9/1978 | Knight | ................. 188/196 BA |
| 4,380,276 A | * | 4/1983 | Sweet et al. | ......... 188/196 BA |
| 5,350,043 A | | 9/1994 | Crewson et al. | ......... 188/79.55 |

* cited by examiner

*Primary Examiner*—Pam Rodriguez
(74) *Attorney, Agent, or Firm*—Simpson & Simpson, PLLC

(57) ABSTRACT

A vehicle brake slack adjuster of the type having a housing pivotally connected to a vehicle brake operator and enclosing a slack adjusting mechanism operably coupled to a vehicle brake operating system and a linkage for operably coupling the vehicle brake operator to the slack adjusting mechanism, characterized in that the linkage includes an outer part having inner and outer ends with the outer end being pivotally coupled to the vehicle brake operator and the inner end mounting a gear rack, an inner part having an outer end mounting a gear rack and an inner end coupled to the slack adjuster mechanism and a rotatable gear engaged with each of the gear racks.

2 Claims, 2 Drawing Sheets

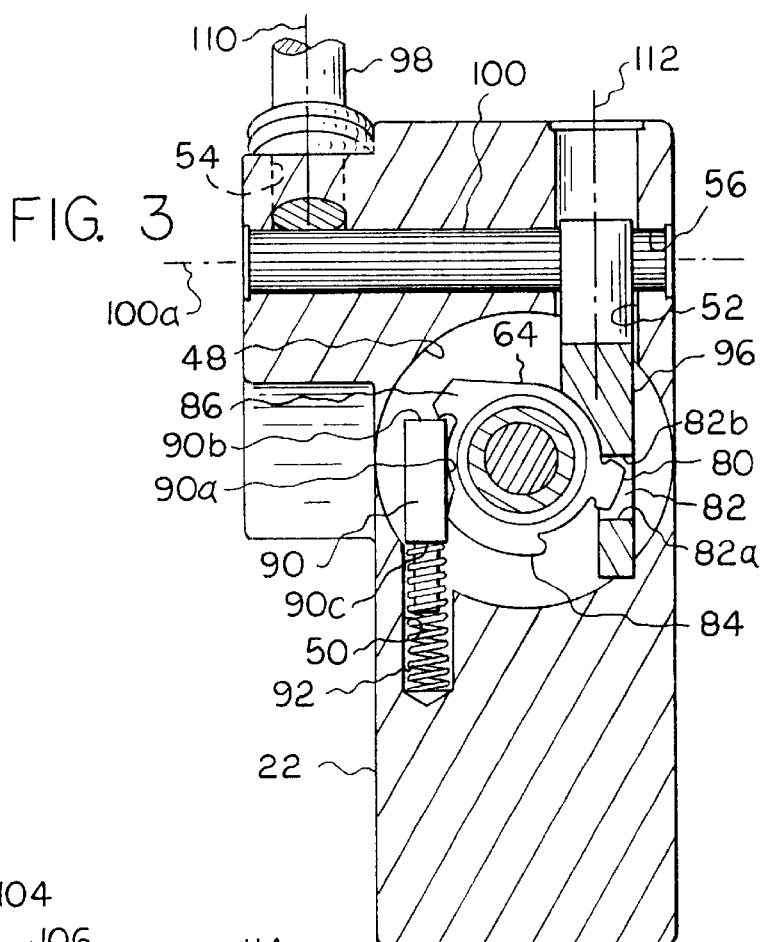
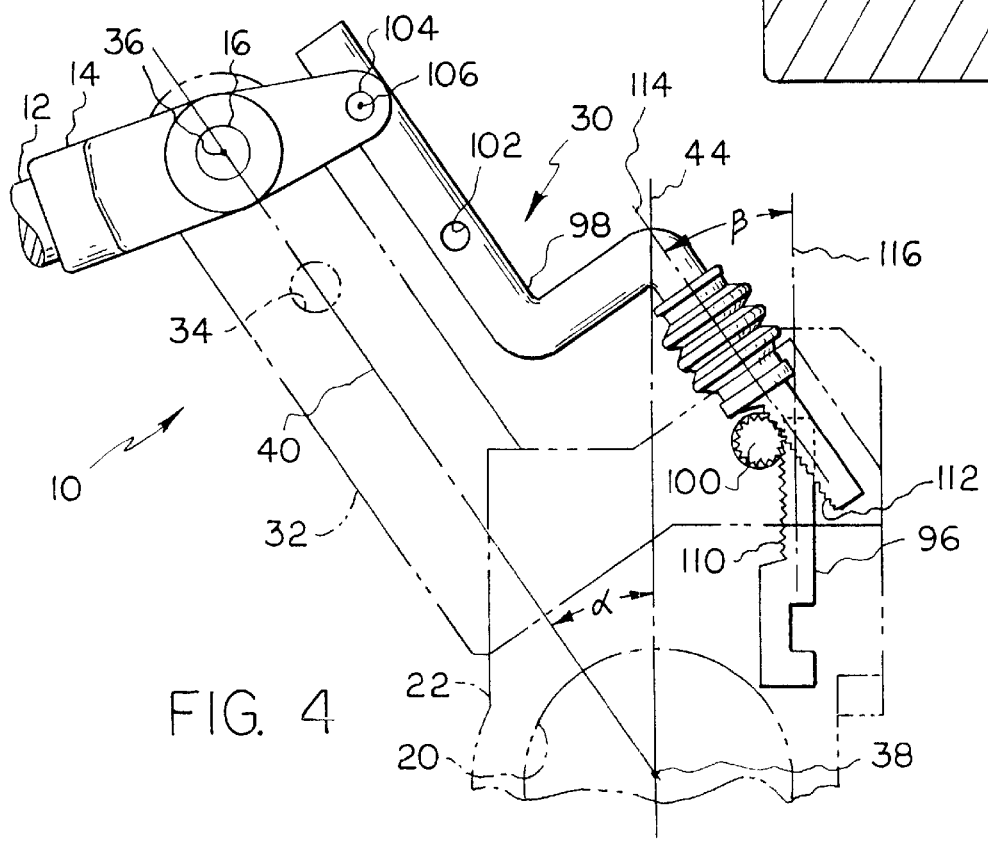

AUTOMATIC SLACK ADJUSTER WITH TWO PART LIFT ROD

BACKGROUND OF THE INVENTION

In my prior U.S. Pat. No. 5,350,043 there is disclosed an improved Automatic Slack Adjuster incorporating a member cooperating with a slack adjuster rotor to determine a reference position for the rotor and to return the rotor to such reference position at the completion of each brake operational cycle, wherein the rotor is additionally coupled to a reciprocating operating link movable by a brake operator for rotating the rotor in a first direction when brakes are applied and a second direction when such brakes are released. Typically, these slack adjusters are designed for use with vehicles having large wheels fitted with brake drums on the order of sixteen and one-half inch diameters.

The only problem encountered with this prior slack adjuster is that of installing the adjuster in certain brake installations, such as those used on vehicles using small diameter wheels and associated small brake drums on the order of six and one-half inch diameters, and characterized as not allowing sufficient room for normal operating movements of the slack adjusters.

SUMMARY OF THE INVENTION

The present invention is directed to a modification of the slack adjuster construction disclosed by U.S. Pat. No. 5,350,043, which allows for its installation in confined environments.

More specifically, the present invention contemplates a two-fold modification of the structure of the prior slack adjuster disclosed by U.S. Pat. No. 5,350,043, which consists of replacing its one piece operating link with a two part operating link, wherein a first or inner link part is slidably supported by the housing of the slack adjuster and has its inner end shaped in the same manner as an inner end of the one piece link of the prior slack adjuster and a second or outer link part shaped to provide an inner end slidably supported by the housing and an outer end adapted for pivotal coupling to a brake actuator; and a toothed gear is arranged for engagement with a first rack carried by an outer end of the first link part and a second rack carried by the inner end of the second link part. Further, the operating arm of the present housing is inclined relative to the position assumed by the operating arm of the prior slack adjuster.

BRIEF DESCRIPTION OF THE DRAWINGS

The nature and mode of operation of the present invention will now be more fully described in the following ailed description taken with the accompanying drawings wherein:

FIG. 3 is a sectional view taken generally along the line 3—3 in FIG. 2 with elements of the slack adjuster shown in brake applied positions thereof; and FIG. 4 is a side elevational view with the housing of the slack adjuster broken away to show positioning of the parts of the operating link in reference to the housing.

DETAILED DESCRIPTION OF THE PREFERRED EMBODIMENT

Figure 1:
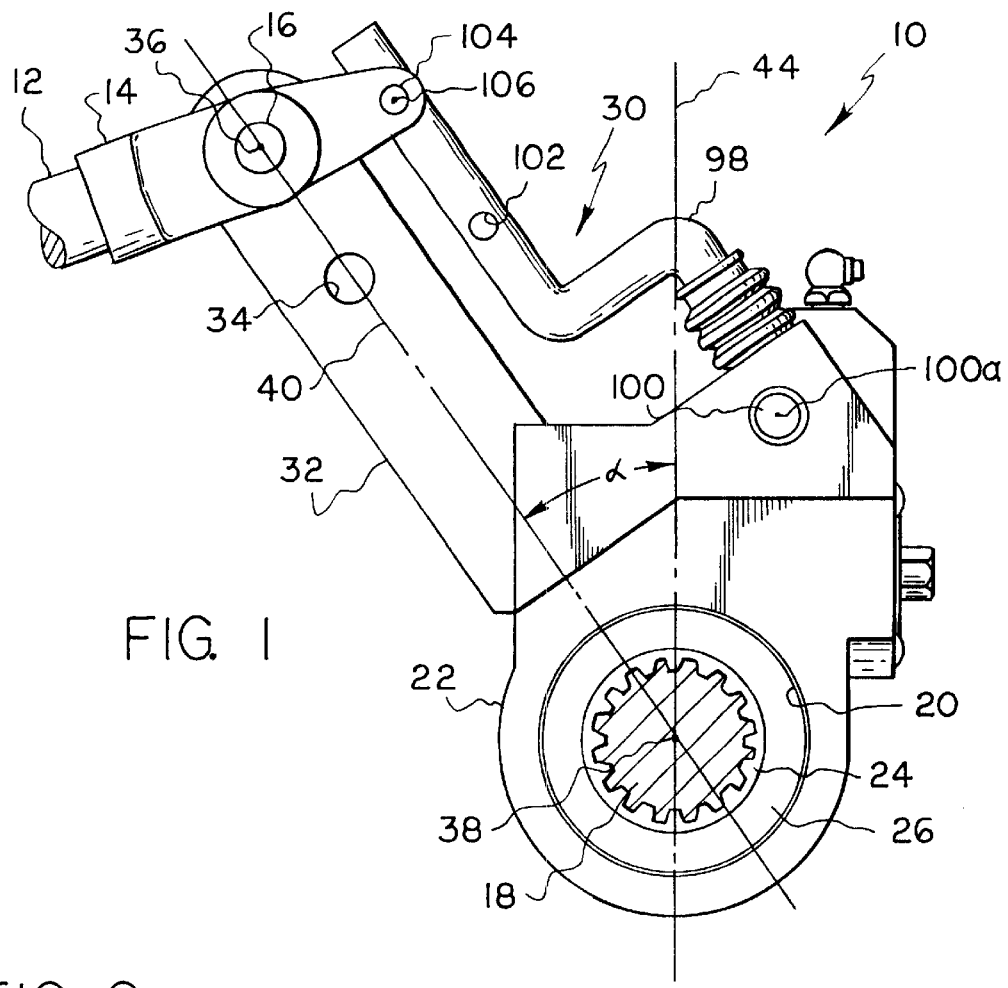
FIG. 1 is a side elevational view of an automatic slack adjuster formed in accordance with a preferred form of the present invention.

Reference is first made to FIG. 1, wherein an automatic slack adjuster of the present invention is generally designated as 10 and shown as being adapted for coupling to a known brake operating system, not shown, via an operating rod 12, a clevis 14 and a pivot pin 16; and to a known brake assembly, not shown, via a cam shaft 18, rotatably supported within a through opening 20 of a housing 22 of the slack adjuster via a spline connection 24 and worm gear 26. Housing 22 serves to enclose an automatic slack adjuster mechanism 28, which is coupled to cam shaft 18 via worm gear 26 and spline connection 24 and to the brake operating system via a linkage 30.

Housing 22 is provided with an integrally formed arm 32 having one or more bore openings 34 sized to slidably receive pivot pin 16 for purposes of coupling the housing to the brake operating system for relative pivotal movement about a first axis 36, which is disposed parallel to a second axis 38 corresponding to the axis of cam shaft 18 about which housing rotates incident to reciprocating movement of operating rod 12 under the control of the brake operating system. Axes 36 and 38 are arranged in a first plane 40 shown in FIGS. 1 and 4. By reference to FIGS. 1 and 4, it will be understood that second axis 38 also lies in a second plane 44, which is arranged to bisect housing 22 and form an angle α with the first plane, which is greater than 0° and less than 180°, and preferably less than 90°.

Housing 22 is also formed with a first or stepped diameter bore opening 48 extending normal to cam shaft receiving opening 20 and adapted for receipt of slack adjuster mechanism 28; second and third bore openings 50 and 52 communicating with bore opening 48; a fourth bore opening 54; and a fifth bore opening 56 extending normal to bore opening 48 and communicating with bore openings 52 and 54.

Slack adjuster mechanism 28 preferably corresponds to that disclosed by U.S. Pat. No. 5,350,043, which is incorporated by reference herein. However, to facilitate understanding of the present invention, mechanism 28 will be briefly described as including a worm shaft 60 arranged within first bore opening 48 in engagement with worm gear 26 and supported for both rotational and axial movement between a first axial position shown in FIG. 2 and a second position, not shown, in which it is displaced to the left of its first axial position against the return bias of spring 62. A rotor 64 and a coupling 66 are slidably and rotatably supported on worm shaft 60 by bearing sleeve 60a with rotor 64 being normally coupled for rotation with coupling 66 by a one way clutch 68 defined by ratchet teeth 68a and 68b, and coupling 66 being normally coupled to the worm shaft by a slip device 70 defined by shallow grooves 72a and teeth 72b. Teeth 68a and 68b are shaped and arranged to permit uncoupling of rotor 64 relative to coupling 66 when the rotor is driven for rotation about the axis of worm shaft 60 in a first direction, i.e. counterclockwise from a reference position shown in FIG. 3, and to permit coupling 66 to be driven for rotation with rotor 64 when the rotor is driven for rotation in a second direction, i.e. clockwise from an intermediate position, not shown, for return to its reference position. A spring 76 tends to bias ratchet teeth 68a into engagement with coupling teeth 68b and spring 62 tends to bias worm shaft 60 into its first position shown in FIG. 2, wherein grooves 72a and teeth 72b engage for purposes of connecting coupling 66 for rotation with the worm shaft.

Rotor 64 is shaped to define a radially outwardly projecting lug 80 adapted to project into a transversely extending recess 82 formed in the inner end of linkage 30 and first and second abutments 84 and 86.

Recess 82 is formed with lower and upper surfaces 82a and 82b. Abutments 84 and 86 are arranged for operable engagement with a member 90, which is slidably supported within bore opening 50 and biased outwardly thereof by a return spring 92. Member 90 has a side surface defining a first abutment surface 90a and oppositely facing end surfaces defining second and third abutment surfaces 90b and 90c, respectively. First abutment surface 90a is arranged to be engaged with first abutment 84 to define a reference position for rotor 64 shown in FIG. 3; second abutment surface 90b is arranged for engagement with by second abutment 86; and third abutment surface is arranged for engagement by return spring 92.

In accordance with the present invention, linkage 30 includes a first or inner link part 96, which is slidably received within third bore opening 52, and a second or outer link part 98, which has its inner end slidably received within fourth bore opening 54, and a toothed gear 100 received within fifth bore opening 56 for rotation about a fourth axis 100a. The inner end of inner link part 96 serves to define recess 82 and the outer end of outer link part 98 defines one or more bore openings 102 adapted to slidably receive a pivot pin 104 by which the linkage is coupled to the vehicle brake operating means via a clevis 14 and rod 12 for relative pivotal movement about third axis 106. The relatively adjacent ends of inner link part 96 and outer link part 98 are formed with gear racks 110 and 112 arranged for engagement with gear 100, such that the inner link part moves inwardly and outwardly relative to housing 22 incident to like movements of outer link part 98.

By referring to FIGS. 3 and 4, it will be understood that reciprocating movement of outer link part 98 relative to housing 22 occurs along a first path of travel and reciprocating movement of inner link part relative to the housing occurs along a second path of travel, wherein such paths of travel lie in essentially parallel planes 114 and 116, and form an angle β greater than 0° and less than 180° relative to one another. Additionally, the first path of travel is disposed essentially parallel to first plane 40 and the second path of travel is disposed essentially parallel to second plane 44.

In operation, slack adjuster 10 normally assumes an initial position shown in FIG. 1, wherein the brakes of a vehicle are fully released. In this initial position of the slack adjuster, teeth 68a and 68b of one way clutch 68 are engaged, and grooves and teeth 72a and 72b of slip means 70 are engaged, as shown in FIG. 2; and inner link part 96 occupies an initial fully inserted position within housing 22 and rotor 64 occupies its reference position, as shown in FIG. 3, wherein first abutment 84 is engaged with first abutment surface 90a, return spring 92 is partially extended and maintains second abutment surface 90b in under engagement second abutment 86, and lug 80 is disposed slightly above lower recess surface 82a of the inner link part.

Upon application of braking force to the brake operating system, operator shaft 12 is forced to move to the right, as viewed in FIG. 1, and thereby cause housing 22 and worm gear 26 to rotate about axis 38 through some angle until cam shaft 18 has been rotated sufficiently to fully apply the brakes of a vehicle. As an incident to such rotation of housing 22, link 30 is partially withdrawn from within housing 22, due to its pivot connection with clevis 14, until it assumes an extended position, not shown. As link 30 is extended, lower recess surface 82a first engages lug 80 and then lifts the lug to thereby impart counterclockwise directed rotation to rotor 64, as viewed in FIG. 3, until the rotor is moved into its intermediate position, not shown, coincident with the arrival of the link in its extended position. As rotor 64 is rotated from its reference position into its intermediate position, spring 76 permits the rotor to ratchet relative to coupling 66, and return spring 92 is further compressed as member 90 is forced to slide within recess 50, due to engagement of second abutment 86 with second abutment surface 90b.

During the whole of the braking operation, worm shaft 60 tends to remain fixed against rotation, and thus worm gear 26 remains essentially rotationally fixed relative to housing 22, such that both the worm gear and cam shaft 18 are rotated for brake application purposes. On the other hand, as braking force is applied, worm shaft 60 tends to move towards the left, as viewed in FIG. 2, against the bias of spring 62, due to the axial reaction force created between worm gear 26 and worm shaft 60. As long as this braking force is below a certain limit, spring 62 will not yield, but when such force overcomes the preload of the spring, worm shaft 60 will be axially displaced until arrested by suitable means. Upon displacement of worm shaft 60 in this manner, grooves and teeth 72a and 72b tend to become disengaged, such that coupling 66 is free to rotate relative to worm shaft 60.

Figure 2:
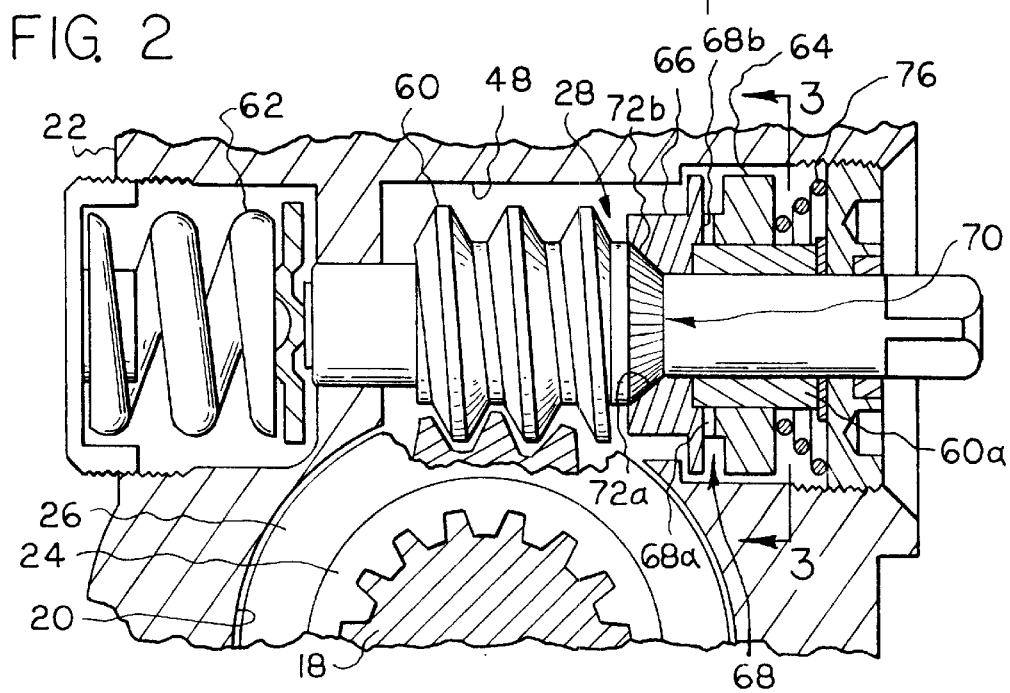
FIG. 2 is a view of the slack adjuster with portions of the slack adjuster housing broken away to show operating elements of the slack adjuster.

In order to insure complete disengagement of grooves and teeth 72a and 72b incident to axial displacement of worm shaft 60 against the bias of spring 62, there is provided restraining means in the form of a second abutment surface on housing 22, which is arranged for engagement by coupling 66 and is adapted to limit worm shaft following movement of the coupling to the left, as viewed in FIG. 2, under the bias of spring 76.

Upon release of braking force on the brake operating system, operator shaft 12 is retracted until housing 22 is rotated counterclockwise for return to its initial position shown in FIG. 1, and coincident therewith inner link part 96 is forced to return to its initial contracted position shown in FIG. 3. As inner link part 96 moves towards its initial position, return spring 92 operating through member 90, biases rotor 64 for rotation in a clockwise direction for return to its reference position viewed in FIG. 3. The speed of this clockwise rotation of rotor 64 is limited by the speed at which inner link part 96 is returned to its initial position, since return spring 92 tends to maintain lug 80 in following engagement with link lower surface 82b. Further, during rotation of rotor 64 towards its reference position, coupling 66 is coupled for rotation with the rotor, due to the presence of one way clutch 68. However, coupling 66 remains uncoupled from worm shaft 60, until such time as axial loading of the worm shaft decreases sufficiently to permit compression spring 62 to force the worm shaft to the right as viewed in FIG. 2 for purposes of reengaging slip means 70. If re-engagement of slip means 70 does not occur until substantially coincident with the return of rotor 64 to its reference position, no rotational movement will be imparted to worm shaft 60 by the rotor, during the brake operational cycle, and, thus, no adjustment of the vehicle brakes will occur during such cycle and the brakes will remain in properly adjusted condition. On the other hand, if positive re-engagement of slip means 70 should occur before return of rotor 64 to its reference position, rotor 64 will be operable to drive worm shaft 60 for rotation with the result that the worm shaft will drive worm gear 26 and thus rotate cam shaft 18 for rotation relative to housing 22 to take up slack existing in the vehicle brake system. After any such slack adjustment, no further rotation of cam shaft 18 relative to housing 22 will occur during subsequent brake operational cycles, until a subsequent slack condition occurs, due for instance to the further wearing away of brake pads incorporated in the vehicle brake system.

What I claim is:

1. In a vehicle brake slack adjuster having a housing formed with an operation arm having a free end adapted to be connected to a vehicle brake operating means for pivotal movement about a first axis, a through opening for rotatably receiving a cam shaft of a vehicle brake system, said cam shaft defining a second axis about which said housing may undergo pivotal movement, a slack adjustment means mounted internally of said housing and coupled with said cam shaft, and link means having an inner end supported by said housing for reciprocating movement and arranged for operative engagement with said slack adjustment means and an outer end adapted to be connected to said vehicle brake operating means for pivotal movement about a third axis disposed parallel to said first axis and operable upon rotational movement of said housing by said vehicle brake operating means about said second axis to effect reciprocation of said inner end of said link means relative to said housing, the improvement wherein said first and second axes are parallel and lie in a first plane, said second axis also lies in a second plane arranged to bisect said housing and to form an angle greater than zero degrees and less than 180° with said first plane, said link means includes separate inner and outer link parts having adjacent ends each formed with a gear rack, said inner end of said link means is defined by said inner link part and mounted by said housing for reciprocating movement essentially parallel to said second plane, said outer end of said link means is defined by said outer link part and mounted by said housing for reciprocating movement essentially parallel to said first plane, and a gear is supported by said housing for rotation about a fourth axis disposed essentially parallel to both said first and second planes and arranged to mesh with said gear rack on each of said adjacent ends of said inner and outer link parts for causing said inner part to move relatively inwardly and outwardly of said housing incident to like movements of said outer part relative to said housing.

2. A vehicle brake slack adjuster comprising a housing internally fitted with a slack adjustment means, an arm for pivotally connecting said housing to a vehicle brake operating means for pivotal movement about a first axis to effect pivotal movement of said housing about a second axis defined by a cam shaft adapted for use in connecting said slack adjustment means to a vehicle brake operating system, and linkage means for operably connecting said slack adjustment means to said vehicle brake operating means, said linkage means including an outer part and an inner part coupled by a gear, said outer part having an inner end supported for reciprocating movement by said housing for movement along a first path of travel and an outer end adapted for connection for pivotal movement to said vehicle brake operating system about a third axis disposed parallel to said first and second axes, said inner part being supported for reciprocating movement by said housing movement along a second path of travel and having an inner end operably coupled to said slack adjustment means and an outer end, said first and second paths of travel lying in essentially parallel planes and being arranged at an angle greater than 0° and less than 180° relative to one another, and said inner end of said outer part and said outer end of said inner part each mounting a gear rack engaged with said gear for causing said inner part to move relatively inwardly and outwardly of said housing incident to like movements of said outer part, and said gear is rotatable about a fourth axis disposed essentially parallel to said first, second and third axes.

* * * * *